US012783552B2

(12) United States Patent
Huang et al.

(10) Patent No.: US 12,783,552 B2
(45) Date of Patent: Nov. 3, 2026

(54) AUTOMATICALLY GENERATING CONTEXT-BASED DYNAMIC OUTPUTS USING ARTIFICIAL INTELLIGENCE TECHNIQUES

(71) Applicant: Dell Products L.P., Round Rock, TX (US)

(72) Inventors: Shuangchen Huang, Singapore (SG); Li Ching Soong, Singapore (SG); Azad Akbar, Singapore (SG); Antony Prabakaran Jayaveeran, Singapore (SG); Raghavendra Puttappa, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/638,961

(22) Filed: Apr. 18, 2024

(65) Prior Publication Data

US 2025/0328546 A1 Oct. 23, 2025

(51) Int. Cl.
*G06F 16/28* (2019.01)
*G06F 16/242* (2019.01)
*G06F 40/205* (2020.01)

(52) U.S. Cl.
CPC .......... *G06F 16/285* (2019.01); *G06F 16/243* (2019.01); *G06F 40/205* (2020.01)

(58) Field of Classification Search
CPC ..... G06F 16/285; G06F 16/243; G06F 40/205
USPC .......................................................... 707/737
See application file for complete search history.

(56) References Cited

U.S. PATENT DOCUMENTS

| | | | | |
|---|---|---|---|---|
| 10,769,176 | B2 * | 9/2020 | Chino | G06F 40/134 |
| 11,200,506 | B2 | 12/2021 | Wu et al. | |
| 11,675,824 | B2 * | 6/2023 | Shirwadkar | G06F 16/36<br>707/737 |
| 2007/0220036 | A1 * | 9/2007 | Das | G06Q 10/00<br>707/999.102 |
| 2018/0357286 | A1 | 12/2018 | Wang et al. | |
| 2019/0087455 | A1 * | 3/2019 | He | G10L 15/22 |
| 2020/0327197 | A1 * | 10/2020 | Bhowal | G06N 5/041 |
| 2021/0081836 | A1 | 3/2021 | Polleri et al. | |
| 2021/0209102 | A1 * | 7/2021 | Dinh | G06N 5/04 |

(Continued)

*Primary Examiner* — Cam Linh T Nguyen
(74) *Attorney, Agent, or Firm* — Ryan, Mason & Lewis, LLP

(57) ABSTRACT

Methods, apparatus, and processor-readable storage media for automatically generating context-based dynamic outputs using artificial intelligence techniques are provided herein. An example computer-implemented method includes obtaining at least one query from at least one user device using at least one user interface; classifying at least one intention associated with the at least one query by processing the at least one query using one or more artificial intelligence techniques; identifying at least one data source related to the at least one query and/or the classified intention(s) by processing the at least one query using the artificial intelligence technique(s); dynamically generating at least one context-based version of the at least one query by integrating at least a portion of the classified intention(s) and data associated with the identified data source(s) into the at least one query; and performing automated action(s) based on the dynamically generated context-based version(s) of the at least one query.

20 Claims, 8 Drawing Sheets

(56) References Cited

U.S. PATENT DOCUMENTS

| | | | | |
|---|---|---|---|---|
| 2022/0020377 | A1* | 1/2022 | Paulraj | H04L 63/08 |
| 2022/0318860 | A1* | 10/2022 | Dorch | G10L 15/28 |
| 2023/0216956 | A1* | 7/2023 | Nesargi | H04M 3/5141 379/265.09 |
| 2024/0020318 | A1* | 1/2024 | Patil | G06F 16/285 |
| 2024/0289407 | A1* | 8/2024 | Rofouei | G06F 16/9577 |
| 2024/0338710 | A1* | 10/2024 | Mico | G06Q 30/015 |
| 2024/0354436 | A1* | 10/2024 | Mukherjee | G06F 16/3344 |
| 2024/0403568 | A1* | 12/2024 | Øhrn | G06F 40/40 |
| 2025/0045516 | A1* | 2/2025 | Reyna Fernandez | G06F 40/186 |

* cited by examiner

*FIG. 2*

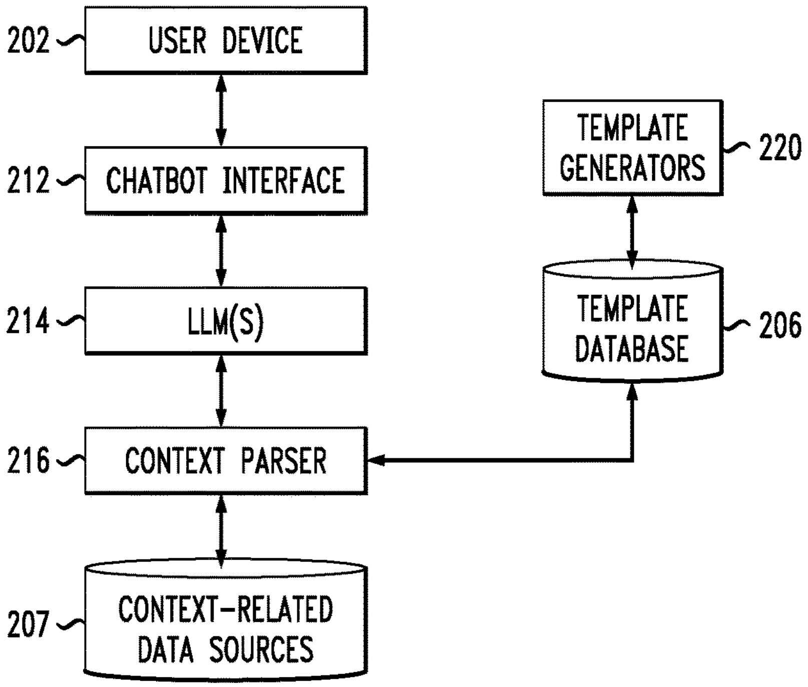

*FIG. 3*

*INPUT* 300

Classify input sentence's intent and related resources using labels below.
Please respond using following format
intents: []
related resources: []

Please note that the sentence may contain multiple intents and multiple related resources.
intents: [troubleshooting, general guidance, resource check]
related resources: [machines, clouds, applications, logs]
input questions: Why can't I deploy application A on machine B? Can you help to check the status of machine B?

*OUTPUT* 301 intents: [troubleshooting, resource check]
related resources: [machines, applications]

FIG. 4

400

```
scenario: Troubleshooting Scenario
  context:
    instructions:
      Based on the provided context, please answer the following questions directly
    topics:
      connectivity:
        description: connectivity issue
        possible_solution:
          - Check the network infrastructure
          - Verify signal strength
          - Address interference
        suggested_preventive_actions:
          - Regular network monitoring
          - Signal strength assessment
      hardware:
        description: hardware issues
        possible_solution:
          - Check for power surges
          - Assess electrical infrastructure inside the building or server room
          - Monitor CPU temperature and address overheating
        suggested_preventive_actions:
          - Implement surge protection measures
          - Maintain a stable electrical infrastructure
    data sources:
      machines:
        query: "{{query.list_machines}}"
        fields: ["id", "name", "ip", "status", "last_known", "created_by", "extra.networks"]
      logs:
        query: "{{query.list_logs}}"
        fields: ["id, "name", "timestamp", "title", "description", "log_type", "severity"]
    user_question: "{{user's question}}"
```

*FIG. 5*

500

```
scenario: #General Guidance
  context:
    instructions:
      Based on the provided context, please answer the following questions directly
    topics:
      onboarding:
        description: onboarding user guide
        steps:
          - Start Remote Desktop Protocol (RDP) xx1 or xx2
          - Start browser
          - Go to Command Line Tool
          - Go to Artifactory to download the iso file for Manufacturing OS-
          - Use credential details
          - After the iso is downloaded, mount it using remote mounting tool, for both
            CDROM and Floppy
          - Power action choose, Reset to CDROM
          - Click Connect
        possible_issues:
          connection:
            issue: cannot connect to device
            solution: reboot
    data_sources:
      machines:
        query: "{{query.list_machines}}"
        fields: ["id", "name", "ip", "status", "last_known, "created_by", "extra.networks"]
      clouds:
        query: "{{query.list_clouds}}"
        fields: ["id", "name", "user", "hostname", "protocol"]
      applications:
        query: "{{query.list_applications}}"
        fields: ["id", "name", "resource_constraint", "os", "artifacts"]
    user_questions: "{{user's question}}"
```

FIG. 6

700

```
scenario: #Resource Query
  context:
    instructions:
      Based on the provided context, please answer the following questions directly
    topics:
      data_insights:
        machines:
          description: insights of machines data
          insights:
          - machine's onboarding completes when its state is provisioned
          - machine is actual device if it has no parent
          - action field in machine means if user can perform the action on the machine or not
    data_sources:
      selected_resource: #default is all resources
        list: "{{related_resources}} or all"
      machines:
        query: "{{query.list_machines}}"
        fields: ["id", "name", "ip", "status", "last_known", "created_by", "extra.networks"]
      clouds:
        query: "{{query.list_clouds}}"
        fields: ["id", "name", "user", "hostname", "protocol"]
      applications:
        query: "{{query.list_applications}}"
        fields: ["id", "name", "resource_constraint", "os", "artifacts"]
    user-question: "{{user's question}}"
```

*FIG. 7*

700

```
(Instruction)
Based on the provided context, please answer the following questions directly

(Topics)
Connectivity: connectivity issue
    possible_solution:
      -Check the network infrastructure
      -Verify signal strength
      -Address interference
    suggested_preventive_actions:
      -Regular network monitoring
      -Signal strength assessment...
...

(References)
machines: {query.list_machines}
logs: {query.list_logs}
questions: {user's question}
```

AUTOMATICALLY GENERATING CONTEXT-BASED DYNAMIC OUTPUTS USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In many scenarios, chatbots (e.g., computer programs that simulate and/or carry out communication exchanges) are used to perform and/or facilitate a variety of tasks. However, conventional chatbot systems often fail to determine and/or offer precise guidance, particularly within complex and/or dynamic environments characterized by a multitude of interconnected devices. For example, implementation of conventional chatbot systems in such contexts, which can include multiple device types and/or diverse data streams, can result in latencies and resource-intensive errors.

SUMMARY

Illustrative embodiments of the disclosure provide techniques for automatically generating context-based dynamic outputs using artificial intelligence techniques.

An exemplary computer-implemented method includes obtaining at least one query from at least one user device using at least one user interface, and classifying one or more intentions associated with the at least one query by processing at least a portion of the at least one query using one or more artificial intelligence techniques. The method also includes identifying one or more data sources related to one or more of the at least one query and the one or more classified intentions by processing the at least a portion of the at least one query using the one or more artificial intelligence techniques. Additionally, the method includes dynamically generating at least one context-based version of the at least one query by integrating at least a portion of the one or more classified intentions and data associated with at least a portion of the one or more identified data sources into at least a portion of the at least one query. Further, the method also includes performing one or more automated actions based at least in part on the at least one dynamically generated context-based version of the at least one query.

Illustrative embodiments can provide significant advantages relative to conventional chatbot systems. For example, problems associated with latencies and resource-intensive errors are overcome in one or more embodiments through automatically generating context-based dynamic outputs to user queries using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 2 shows example system architecture in an illustrative embodiment.

FIG. 3 shows an example intention classification and related resource input and output in an illustrative embodiment.

FIG. 4 shows example pseudocode for implementing at least a portion of an example template structure in an illustrative embodiment.

FIG. 5 shows example pseudocode for implementing at least a portion of an example template structure in an illustrative embodiment.

FIG. 6 shows example pseudocode for implementing at least a portion of an example template structure in an illustrative embodiment.

FIG. 7 shows an example constructed context-enhanced prompt in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
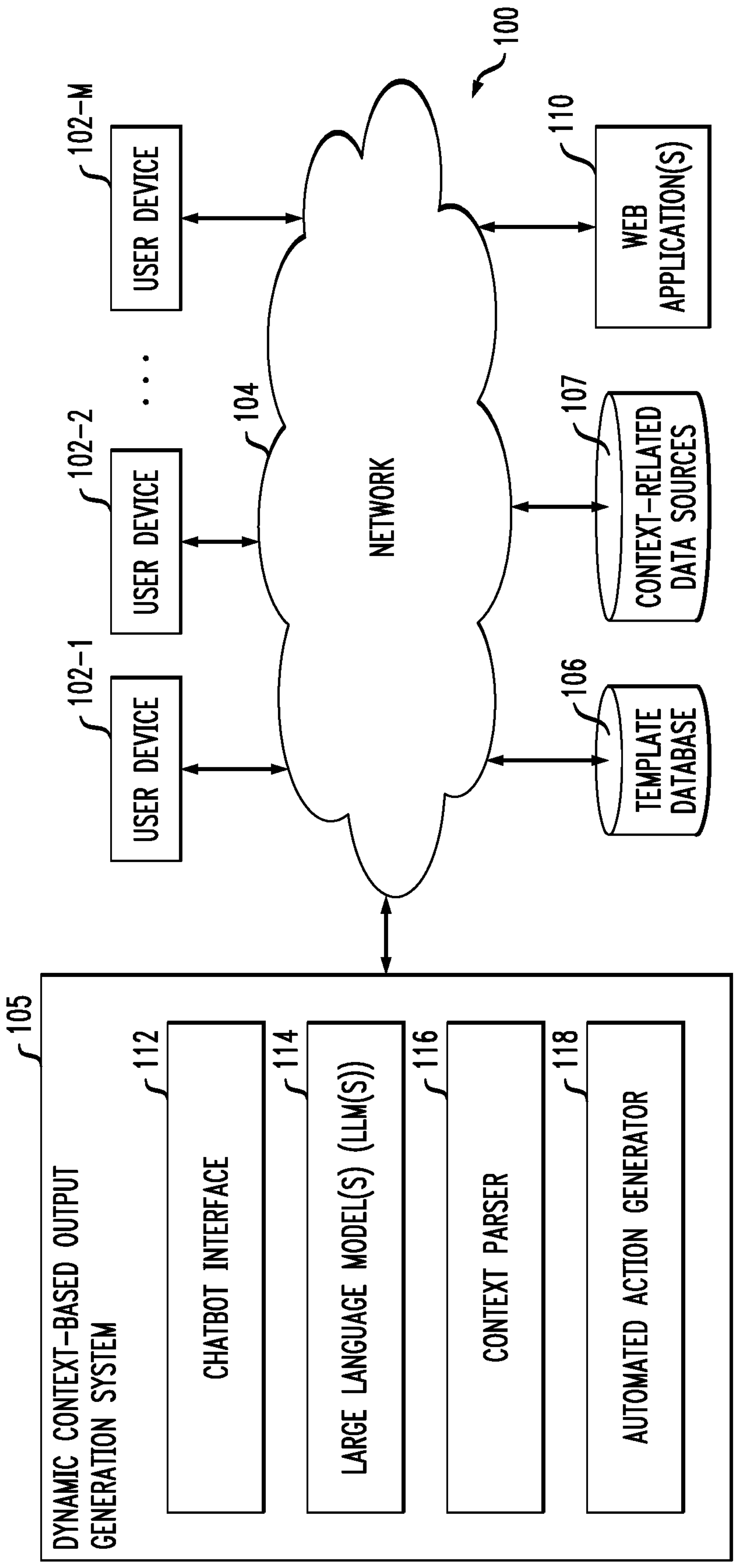
FIG. 1 shows an information processing system configured for automatically generating context-based dynamic outputs using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is dynamic context-based output generation system 105 and one or more web applications 110 (e.g., one or more communications applications, one or more user support applications, one or more web development applications, one or more e-commerce applications, etc.).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the dynamic context-based output generation system 105 can have an associated template database 106 configured to store data pertaining to various dynamic output-related templates associated with one or more specific user intentions (e.g., troubleshooting, general guidance, resource queries, etc.). The dynamic context-based output generation system 105 can also have an associated collection of context-related data sources 107 configured to store various data related to one or more portions of one or more user queries and/or one or more edge environments such as, e.g., application data, log data, various metrics data, etc.

The template database 106 and/or the context-related data sources 107 in the present embodiment can be implemented using one or more storage systems associated with the dynamic context-based output generation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the dynamic context-based output generation system 105 are one or more input-output devices, which illustratively comprise keyboards, displays or other types of input-output devices in any combination. Such input-output devices can be used, for example, to support one or more user interfaces to the dynamic context-based output generation system 105, as well as to support communication between the dynamic context-based output generation system 105 and other related systems and devices not explicitly shown.

Additionally, the dynamic context-based output generation system 105 in the FIG. 1 embodiment is assumed to be implemented using at least one processing device. Each such processing device generally comprises at least one processor and an associated memory, and implements one or more functional modules for controlling certain features of the dynamic context-based output generation system 105.

More particularly, the dynamic context-based output generation system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the dynamic context-based output generation system 105 to communicate over the network 104 with the user devices 102, and illustratively comprises one or more conventional transceivers.

The dynamic context-based output generation system 105 further comprises chatbot interface 112, one or more large language models (LLMs) 114, context parser 116, and automated action generator 118.

It is to be appreciated that this particular arrangement of elements 112, 114, 116 and 118 illustrated in the dynamic context-based output generation system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automatically generating context-based dynamic outputs using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of dynamic context-based output generation system 105, template database 106, context-related data sources 107, and web application(s) 110 can be on and/or part of the same processing platform.

An exemplary process utilizing elements 112, 114, 116 and 118 of an example dynamic context-based output generation system 105 in computer network 100 will be described in more detail with reference to the flow diagram of FIG. 8.

Accordingly, at least one embodiment includes implementing real-time support for managing one or more edge environments with one or more LLMs using template-based context information. Complex and dynamic environments characterized by a multitude of interconnected devices, referred to herein as edge environments, can encompass settings wherein the devices are distributed within and/or across a network (e.g., distributed closer to a data source and/or user). As such, and as further detailed herein, one or more embodiments include integrating one or more LLMs into edge environments using template-based context information, thereby facilitating and/or enabling dynamic and contextually relevant advice and/or guidance.

FIG. 2 shows example system architecture in an illustrative embodiment. By way of illustration, FIG. 2 depicts user device 202 interacting with chatbot interface 212, which can include user device 202 providing and/or submitting one or more questions (e.g., questions varying from general to highly specific inquiries) to chatbot interface 212. Chatbot interface 212, in one or more embodiments, encompasses a user interface for users to interact with the system detailed herein in order to determine and/or obtain one or more details about at least one given edge environment.

As also depicted in FIG. 2, one or more LLMs 214 (e.g., at least one generative pretrained transformer (GPT) model, one or more bidirectional encoder representations from transformers (BERT) models, etc.) can process at least a portion of the inputs provided to and/or processed via chatbot interface 212 to classify one or more user intentions and identify one or more relevant resources related to the one or more user intentions. Such determinations can then be provided to and/or processed by context parser 216, along with at least one of the one or more questions submitted by user device 202.

As further detailed herein, in one or more embodiments context parser 216 includes a software program that can integrate with one or more artificial intelligence techniques. One function of context parser 216 is to identify at least one appropriate template corresponding to at least one user intent. Once the at least one appropriate template is selected, context parser 216 dynamically populates the at least one template with specific information and/or data according to predefined instructions and one or more data sources within the at least one template. More particularly, in one or more embodiments, context parser 216 can be designed and/or configured to execute one or more placeholder queries mentioned in the template data source(s) to fetch data and logs from one or more machines, ensuring that the most relevant and up-to-date information is used. Further, in at least one embodiment, context parser 216 can be designed and/or configured to utilize one or more semantic search techniques to identify data relevant to the user query, enhancing the accuracy and relevance of the information retrieved. Additionally or alternatively, context parser 216 can be designed and/or configured to construct a well-formulated prompt tailored for one or more LLMs, which facilitates improved LLM comprehension of the user request.

Further, context parser 216 can utilize at least a portion of the noted determinations to construct and/or selected one or more appropriate templates in connection with template database 206. In one or more embodiments, template database 206 includes various templates created by template generators 220 (e.g., software engineers and/or related automated systems (which can incorporate one or more artificial intelligence models such as one or more LLM)), wherein portions of such templates can be associated with one or more specific user intentions (e.g., troubleshooting, general guidance, resource queries, etc.). In one or more embodiments, instruction and context-based information are defined in such templates for specific intentions, and machine data and/or logs and metrics can be retrieved from one or more databases relevant to the user query and incorporated into such templates as well.

Additionally, in connection with the example embodiment depicted in FIG. 2, context parser 216 identifies one or more data sources, mentioned in at least one given template's query section, from context-related data sources 207 and requests data from these one or more data sources to enrich the context of the one or more originally submitted questions. Such data sources within context-related data sources 207 can include, for example, application data, log data, various metrics, etc. Additionally, context parser 216 can integrate data, from the at least one given template and the one or more related data sources, into at least a portion of the one or more questions submitted by user device 202 to assemble and/or generate at least one context-enhanced prompt. As detailed herein, the process of integrating such data can include, for example, replacing one or more placeholders within a given template based at least in part on the placeholder query. As also depicted in FIG. 2, the at least one context-enhanced prompt is sent to one or more LLMs 214 for processing and response generation, wherein the response is ultimately provided to user device 202 via chatbot interface 212.

As noted above in connection with FIG. 2, in one or more embodiments, one or more LLMs 214 can classify one or more user intentions associated with original user input queries and identify one or more relevant resources related to the one or more user intentions. Additionally or alternatively, at least one embodiment can include using at least one multi-label natural language classification model to classify one or more user intentions associated with original user input queries and identify one or more relevant resources related to the one or more user intentions. Based at least in part of these determined outputs (e.g., the given intentions and the related resources), such an embodiment can include selected and/or generating one or more templates (e.g., in connection with template database 206) and providing the same to context parser 216.

FIG. 3 shows an example intention classification and related resource input and output in an illustrative embodiment. By way of illustration, FIG. 3 depicts input 300, which includes a request to classify at least one input sentence/question intent (also referred to herein as intention) and related resources on labels shared therein, wherein the input sentence(s)/question(s) recite(s) "Why can't I deploy application A on machine B? Can you help to check the status of machine B?" As also illustrated in FIG. 3, output 301 includes classifying intents of "troubleshooting" and "resource check," while identifying related resources of "machines" and "applications."

FIG. 4 shows example pseudocode for implementing at least a portion of an example template structure in an illustrative embodiment. In this embodiment, example pseudocode 400 is executed by or under the control of at least one processing system and/or device. For example, the example pseudocode 400 may be viewed as comprising a portion of a software implementation of at least part of dynamic context-based output generation system 105 of the FIG. 1 embodiment.

The example pseudocode 400 illustrates at least a portion of an example template structure related to a troubleshooting scenario, which contains sections including: (i) an instructions section, which includes one or more general directives for guiding the LLM; (ii) a topics section, which includes one or more guidelines for given topics in bullet point structure, incorporating data source insights determined by the LLM, etc.; (iii) a data sources section, which includes at least one query template for accessing given data sources referenced by the LLM; and (iv) a user question(s) section, which includes at least portions of the one or more initial user input queries.

It is to be appreciated that this particular example pseudocode shows just one example implementation of template structure, and alternative implementations can be used in other embodiments.

FIG. 5 shows example pseudocode for implementing at least a portion of an example template structure in an illustrative embodiment. In this embodiment, example pseudocode 500 is executed by or under the control of at least one processing system and/or device. For example, the example pseudocode 500 may be viewed as comprising a portion of a software implementation of at least part of dynamic context-based output generation system 105 of the FIG. 1 embodiment.

The example pseudocode 500 illustrates, similar to example pseudocode 400, at least a portion of an example template structure related to a general guidance scenario. Example pseudocode 500 depicts a similar template structure to that depicted via example pseudocode 400, but with different specific content associated with the instructions section, the topics section, the data sources section, and the user question(s) section.

It is to be appreciated that this particular example pseudocode shows just one example implementation of template structure, and alternative implementations can be used in other embodiments.

FIG. 6 shows example pseudocode for implementing at least a portion of an example template structure in an illustrative embodiment. In this embodiment, example pseudocode 600 is executed by or under the control of at least one processing system and/or device. For example, the example pseudocode 600 may be viewed as comprising a portion of a software implementation of at least part of dynamic context-based output generation system 105 of the FIG. 1 embodiment.

The example pseudocode 600 illustrates, similar to example pseudocode 400 and example pseudocode 500, at least a portion of an example template structure related to a resource query scenario. Example pseudocode 600 depicts a similar template structure to that depicted via example pseudocode 400 and example pseudocode 500, but with different specific content associated with the instructions section, the topics section, the data sources section, and the user question(s) section.

It is to be appreciated that this particular example pseudocode shows just one example implementation of template structure, and alternative implementations can be used in other embodiments.

FIG. 7 shows an example constructed context-enhanced prompt in an illustrative embodiment. By way of illustration, FIG. 7 depicts the format and content of an example context-enhanced prompt 700 generated by a context parser (e.g., context parser 116 and/or context parser 216) based at least in part on an original input query, one or more classified user intentions derived from the original input query, and data pertaining to one or more external data sources associated with the one or more classified user intentions. As depicted in FIG. 7, example context-enhanced prompt 700 includes an instruction to answer, based on the provided context, one or more questions also provided in the example context-enhanced prompt 700. Further, example context-enhanced prompt 700 also provides topical information pertaining to the issue in question, along with one or more possible solutions and one or more suggested preventative actions, as well as references to various data sources related to responding to the one or more questions. In one or more embodiments, such data source references can include data source queries which include one or more application programming interface (API) calls (in the form of listing or retrieving data) and/or one or more structured query language (SQL) queries that have the direct capability to access a given database.

In accordance with one or more embodiments, integration of a context parser with one or more LLMs enables edge devices to process real-time, contextually relevant guidance in response to various queries, improving resource-related efficiencies and reducing latencies. By way of illustration, many environments can include multiple edge devices with different context-specific information such as, e.g., user manuals, device specifications, etc. At least one embodiment can include generating and/or implementing user-friendly information to manage and/or troubleshoot edge devices and related environments. For example, consider a scenario which includes a device onboarding process that encounters challenges that demand wide-ranging expertise from a support team. The incorporation of contextual guidance powered by LLMs, in accordance with one or more embodiments, can address this need by providing comprehensive and nuanced support, effectively covering a wide range of potential issues. Additionally, for example, managing and referencing a diverse array of devices, logs, and corresponding training documents during support can be a complex task which can be addressed by one or more embodiments via dynamic and/or automated prompt generation for LLMs, which enhances effectiveness in real-time support scenarios by generating and/or implementing tailored information and queries. Further, edge device environments may include setup in secluded areas with limited network capacity, and in such a scenario, at least one embodiment can include generating and/or implementing real-time analysis without full data transfer by retrieving only semantically relevant information based at least in part on the queries in the given template.

Accordingly, one or more embodiments include facilitating and/or implementing contextual adaptability using a template-based approach which leverages LLMs to dynamically generate responses based at least in part on context data, which conventional LLM chatbots struggle to achieve. Consequently, such an embodiment can generate and output enhanced and/or more granular responses to user queries than conventional chatbot systems, wherein such responses can be specific to the given user and/or edge environment.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions based on user queries, classified intentions associated with the user queries, and context data related to the classified intentions and/or the user queries, and such recommendations and/or predictions can be used to initiate one or more automated actions (e.g., automatically generate and output one or more responses to one or more input user queries, automatically retrain the model (e.g., at least one LLM), etc.).

Figure 8:
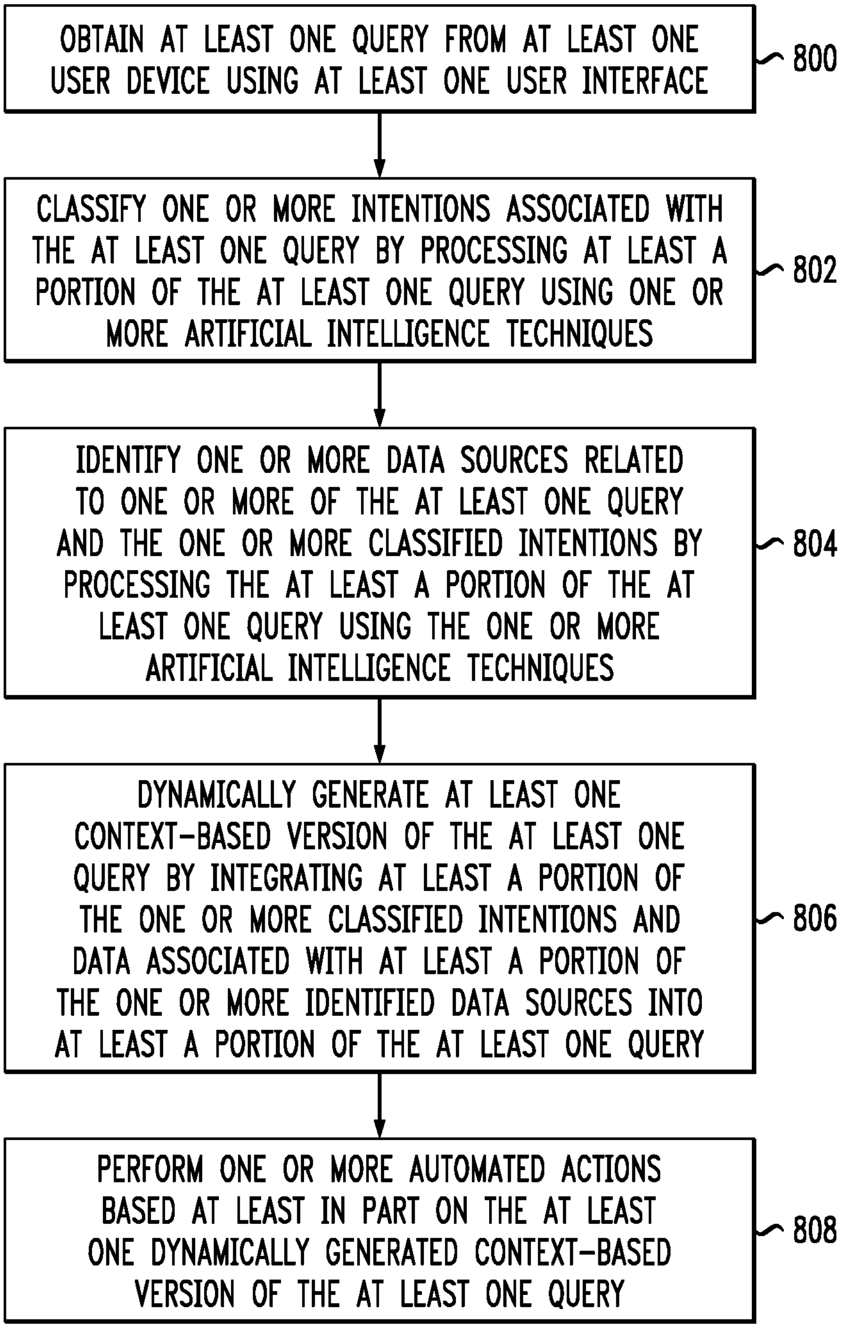
FIG. 8 is a flow diagram of a process for automatically generating context-based dynamic outputs using artificial intelligence techniques in an illustrative embodiment.

FIG. 8 is a flow diagram of a process for automatically generating context-based dynamic outputs using artificial intelligence techniques in an illustrative embodiment. It is to be understood that this particular process is only an example, and additional or alternative processes can be carried out in other embodiments.

In this embodiment, the process includes steps 800 through 808. These steps are assumed to be performed by the dynamic context-based output generation system 105 utilizing elements 112, 114, 116 and 118.

Step 800 includes obtaining at least one query from at least one user device using at least one user interface. In at least one embodiment, obtaining at least one query from at least one user device includes obtaining at least one query from at least one user device using at least one chatbot interface.

Step 802 includes classifying one or more intentions associated with the at least one query by processing at least a portion of the at least one query using one or more artificial intelligence techniques. In one or more embodiments, classifying one or more intentions associated with the at least one query includes processing the at least a portion of the at least one query using one or more LLMs. In such an embodiment, classifying one or more intentions associated with the at least one query can include processing the at least a portion of the at least one query using one or more of at least one GPT model and one or more BERT models.

Step 804 includes identifying one or more data sources related to one or more of the at least one query and the one or more classified intentions by processing the at least a portion of the at least one query using the one or more artificial intelligence techniques. In at least one embodiment, identifying one or more data sources related to one or more of the at least one query and the one or more classified intentions includes processing the at least a portion of the at least one query using one or more LLMs. In such an embodiment, identifying one or more data sources related to one or more of the at least one query and the one or more classified intentions can include processing the at least a portion of the at least one query using one or more of at least one GPT model and one or more BERT models.

Step 806 includes dynamically generating at least one context-based version of the at least one query by integrating at least a portion of the one or more classified intentions and data associated with at least a portion of the one or more identified data sources into at least a portion of the at least one query. In one or more embodiments, integrating data associated with at least a portion of the one or more identified data sources into at least a portion of the at least one query includes automatically accessing at least one of the one or more identified data sources and fetching, therefrom, data related to one or more of the at least one query and the one or more classified intentions.

Step 808 includes performing one or more automated actions based at least in part on the at least one dynamically generated context-based version of the at least one query. In at least one embodiment, performing one or more automated actions includes automatically generating at least one response to the at least one dynamically generated context-based version of the at least one query by processing the at least one dynamically generated context-based version of the at least one query using the one or more artificial intelligence techniques, and outputting the at least one response to the at least one user device via the at least one user interface. Additionally or alternatively, performing one or more automated actions can include one or more of generating at least one template based at least in part on the at least one dynamically generated context-based version of the at least one query and modifying at least one existing template using at least a portion of the at least one dynamically generated context-based version of the at least one query.

Further, in one or more embodiments, performing one or more automated actions can include automatically training at least a portion of the one or more artificial intelligence techniques using feedback related to the at least one dynamically generated context-based version of the at least one query.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically generate context-based dynamic outputs using artificial intelligence techniques. These and other embodiments can effectively overcome problems associated with latencies and resource-intensive errors.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
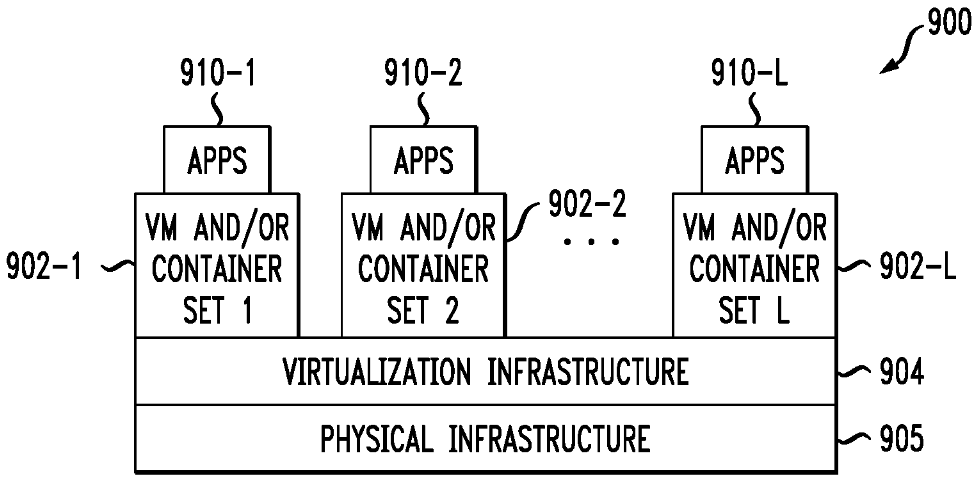
FIGS. 9 and 10 show examples of processing platforms that may be utilized to implement at least a portion of an information processing system in illustrative embodiments.
Figure 10:
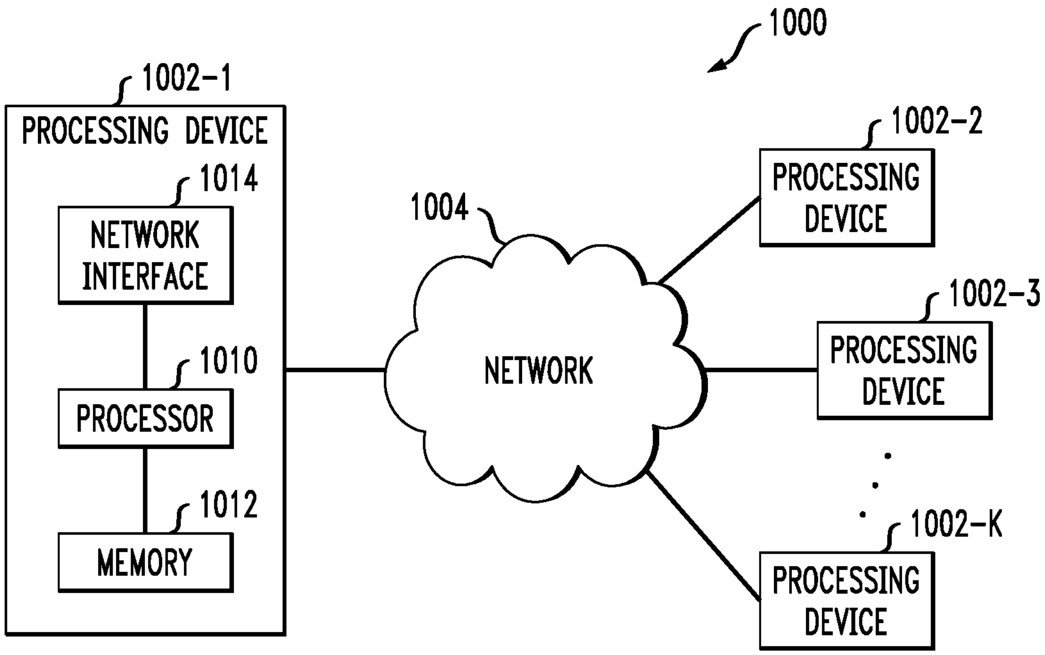

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more information processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a CPU, a GPU, a TPU, a microcontroller, an ASIC, a FPGA or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining at least one query from at least one user device using at least one user interface;

classifying one or more intentions associated with the at least one query by processing at least a portion of the at least one query using one or more artificial intelligence techniques;

identifying at least one query-related template, from one or more template databases, corresponding to at least one of the one or more classified intentions;

accessing one or more data sources identified in the at least one query-related template and executing one or more placeholder queries, associated with the at least one query-related template and the one or more data sources, to fetch data from at least one template-designated portion of the one or more data sources;

dynamically generating at least one context-based version of the at least one query by integrating, with at least a portion of the at least one query, content from the at least one query-related template and at least a portion of the data fetched from the at least one template-designated portion of the one or more data sources, wherein the integrating comprises replacing one or more data placeholders in the at least one query-related template, based at least in part on the executing of the one or more placeholder queries, with the at least a portion of the data fetched from the at least one template-designated portion of the one or more data sources, the at least one query-related template with the integrated data thereby comprising at least a portion of the at least one context-based version of the at least one query; and performing one or more automated actions based at least in part on the at least one dynamically generated context-based version of the at least one query, wherein performing one or more automated actions comprises modifying one or more portions of the at least one query-related template identified from the one or more template databases based at least in part on at least a portion of the at least one dynamically generated context-based version of the at least one query;

wherein the method is performed by at least one processing device comprising a processor coupled to a memory.

2. The computer-implemented method of claim 1, wherein performing one or more automated actions comprises automatically generating at least one response to the at least one dynamically generated context-based version of the at least one query by processing the at least one dynamically generated context-based version of the at least one query using the one or more artificial intelligence techniques, and outputting the at least one response to the at least one user device via the at least one user interface.

3. The computer-implemented method of claim 1, wherein performing one or more automated actions comprises generating at least one query-related template based at least in part on the at least one dynamically generated context-based version of the at least one query.

4. The computer-implemented method of claim 1, wherein classifying one or more intentions associated with the at least one query comprises processing the at least a portion of the at least one query using one or more large language models (LLMs).

5. The computer-implemented method of claim 4, wherein classifying one or more intentions associated with the at least one query comprises processing the at least a portion of the at least one query using one or more of at least one generative pretrained transformer (GPT) model and one or more bidirectional encoder representations from transformers (BERT) models.

6. The computer-implemented method of claim 1, wherein performing one or more automated actions comprises automatically training at least a portion of the one or more artificial intelligence techniques using feedback related to the at least one dynamically generated context-based version of the at least one query.

7. The computer-implemented method of claim 1, wherein obtaining at least one query from at least one user device comprises obtaining at least one query from at least one user device using at least one chatbot interface.

8. A non-transitory processor-readable storage medium having stored therein program code of one or more software programs, wherein the program code when executed by at least one processing device causes the at least one processing device:

to obtain at least one query from at least one user device using at least one user interface;

to classify one or more intentions associated with the at least one query by processing at least a portion of the at least one query using one or more artificial intelligence techniques;

to identify at least one query-related template, from one or more template databases, corresponding to at least one of the one or more classified intentions;

to access one or more data sources identified in the at least one query-related template and executing one or more placeholder queries, associated with the at least one query-related template and the one or more data sources, to fetch data from at least one template-designated portion of the one or more data sources;

to dynamically generate at least one context-based version of the at least one query by integrating, with at least a portion of the at least one query, content from the at least one query-related template and at least a portion of the data fetched from the at least one template-designated portion of the one or more data sources, wherein the integrating comprises replacing one or more data placeholders in the at least one query-related template, based at least in part on the executing of the one or more placeholder queries, with the at least a portion of the data fetched from the at least one template-designated portion of the one or more data sources, the at least one query-related template with the integrated data thereby comprising at least a portion of the at least one context-based version of the at least one query; and to perform one or more automated actions based at least in part on the at least one dynamically generated context-based version of the at least one query, wherein performing one or more automated actions comprises modifying one or more portions of the at least one query-related template identified from the one or more template databases based at least in part on at least a portion of the at least one dynamically generated context-based version of the at least one query.

9. The non-transitory processor-readable storage medium of claim 8, wherein performing one or more automated actions comprises automatically generating at least one response to the at least one dynamically generated context-based version of the at least one query by processing the at least one dynamically generated context-based version of the at least one query using the one or more artificial intelligence techniques, and outputting the at least one response to the at least one user device via the at least one user interface.

10. The non-transitory processor-readable storage medium of claim 8, wherein performing one or more automated actions comprises generating at least one query-related template based at least in part on the at least one dynamically generated context-based version of the at least one query.

11. The non-transitory processor-readable storage medium of claim 8, wherein classifying one or more intentions associated with the at least one query comprises processing the at least a portion of the at least one query using one or more LLMs.

12. The non-transitory processor-readable storage medium of claim 8, wherein performing one or more automated actions comprises automatically training at least a portion of the one or more artificial intelligence techniques using feedback related to the at least one dynamically generated context-based version of the at least one query.

13. The non-transitory processor-readable storage medium of claim 8, wherein obtaining at least one query from at least one user device comprises obtaining at least one query from at least one user device using at least one chatbot interface.

14. An apparatus comprising:

at least one processing device comprising a processor coupled to a memory;

the at least one processing device being configured:

to obtain at least one query from at least one user device using at least one user interface;

to classify one or more intentions associated with the at least one query by processing at least a portion of the at least one query using one or more artificial intelligence techniques;

to identify at least one query-related template, from one or more template databases, corresponding to at least one of the one or more classified intentions;

to access one or more data sources identified in the at least one query-related template and executing one or more placeholder queries, associated with the at least one query-related template and the one or more data sources, to fetch data from at least one template-designated portion of the one or more data sources;

to dynamically generate at least one context-based version of the at least one query by integrating, with at least a portion of the at least one query, content from the at least one query-related template and at least a portion of the data fetched from the at least one template-designated portion of the one or more data sources, wherein the integrating comprises replacing one or more data placeholders in the at least one query-related template, based at least in part on the executing of the one or more placeholder queries, with the at least a portion of the data fetched from the at least one template-designated portion of the one or more data sources, the at least one query-related template with the integrated data thereby comprising at least a portion of the at least one context-based version of the at least one query; and to perform one or more automated actions based at least in part on the at least one dynamically generated context-based version of the at least one query, wherein performing one or more automated actions comprises modifying one or more portions of the at least one query-related template identified from the one or more template databases based at least in part on at least a portion of the at least one dynamically generated context-based version of the at least one query.

15. The apparatus of claim 14, wherein performing one or more automated actions comprises automatically generating at least one response to the at least one dynamically generated context-based version of the at least one query by processing the at least one dynamically generated context-based version of the at least one query using the one or more artificial intelligence techniques, and outputting the at least one response to the at least one user device via the at least one user interface.

16. The apparatus of claim 14, wherein performing one or more automated actions comprises generating at least one query-related template based at least in part on the at least one dynamically generated context-based version of the at least one query.

17. The apparatus of claim 14, wherein classifying one or more intentions associated with the at least one query comprises processing the at least a portion of the at least one query using one or more LLMs.

18. The apparatus of claim 17, wherein classifying one or more intentions associated with the at least one query comprises processing the at least a portion of the at least one query using one or more of at least one GPT model and one or more BERT models.

19. The apparatus of claim 14, wherein performing one or more automated actions comprises automatically training at least a portion of the one or more artificial intelligence techniques using feedback related to the at least one dynamically generated context-based version of the at least one query.

20. The apparatus of claim 14, wherein obtaining at least one query from at least one user device comprises obtaining at least one query from at least one user device using at least one chatbot interface.

* * * * *